(12) United States Patent
Bajaria et al.

(10) Patent No.: US 9,015,110 B2
(45) Date of Patent: Apr. 21, 2015

(54) AUTOMATIC UPDATING OF AGGREGATIONS FOR AGGREGATING DATA

(71) Applicants: Viral Bajaria, Santa Monica, CA (US); Shane Moriah, Los Angeles, CA (US); Ilya Haykinson, Santa Monica, CA (US)

(72) Inventors: Viral Bajaria, Santa Monica, CA (US); Shane Moriah, Los Angeles, CA (US); Ilya Haykinson, Santa Monica, CA (US)

(73) Assignee: Hulu, LLC, Santa Monica, CA (US)

( * ) Notice: Subject to any disclaimer, the term of this patent is extended or adjusted under 35 U.S.C. 154(b) by 71 days.

(21) Appl. No.: 13/722,789

(22) Filed: Dec. 20, 2012

(65) Prior Publication Data

US 2014/0181019 A1  Jun. 26, 2014

(51) Int. Cl.
*G06F 17/30* (2006.01)

(52) U.S. Cl.
CPC .... *G06F 17/30581* (2013.01); *G06F 17/30312* (2013.01)

(58) Field of Classification Search
USPC .................................. 707/609, 624
See application file for complete search history.

(56) References Cited

U.S. PATENT DOCUMENTS

| | | | | |
|---|---|---|---|---|
| 7,809,763 | B2 * | 10/2010 | Nori et al. | 707/802 |
| 2006/0173926 | A1 * | 8/2006 | Kornelson et al. | 707/200 |
| 2007/0156594 | A1 * | 7/2007 | McGucken | 705/51 |
| 2011/0040604 | A1 * | 2/2011 | Kaib et al. | 705/10 |
| 2011/0307462 | A1 * | 12/2011 | Holsman et al. | 707/706 |
| 2012/0047565 | A1 * | 2/2012 | Petersen | 726/7 |
| 2012/0160689 | A1 * | 6/2012 | Utz et al. | 204/549 |
| 2012/0252489 | A1 * | 10/2012 | Meredith et al. | 455/456.1 |
| 2012/0291079 | A1 * | 11/2012 | Gordon et al. | 725/109 |
| 2012/0309420 | A1 * | 12/2012 | Morgan et al. | 455/456.1 |

* cited by examiner

*Primary Examiner* — Kim Nguyen
(74) *Attorney, Agent, or Firm* — Brian N. Young; Fountainhead Law Group PC

(57) ABSTRACT

In one embodiment, a method receives a specification for aggregating data from processing of beacons. A beacon is associated with an event occurring at a client while a user is interacting with a web application and including unstructured data. The method then parses the specification to automatically generate an aggregation to aggregate structured data that has been converted from the unstructured data and stores dependency information for changes to the aggregation. State information is analyzed and the dependency information to determine when a change in the state information indicates that a change should be made to the aggregation. The method then dynamically changes the aggregation based on the analyzing to generate a new aggregation to aggregate different data based on changed information.

20 Claims, 4 Drawing Sheets

200 →

| | Transaction | Views | User ID | Title | Content partner | Device |
|---|---|---|---|---|---|---|
| 204 | 1 | 1 | User #1 | Title #1 | Partner #1 | Mobile |
| 206 | 2 | 1 | User #2 | Title #1 | Partner #1 | Desktop |
| | 3 | 1 | User #3 | Title #2 | Partner #2 | Mobile |
| | 4 | 1 | User #1 | Title #3 | Partner #1 | Mobile |
| | 5 | 1 | User #1 | Title #1 | Partner #1 | Mobile |
| | ... | | | | | |
| | N | N | User #N | Title #N | Partner #N | Device N |

| | Hour | Title | Views |
|---|---|---|---|
| 212 | 7pm-8pm | Title #1 | 200 |
| | 7pm-8pm | Title #2 | 430 |
| 214 | 8pm-9pm | Title #1 | 350 |
| | 8pm-9pm | Title #2 | 300 |

AUTOMATIC UPDATING OF AGGREGATIONS FOR AGGREGATING DATA

BACKGROUND

Companies provide services that users access using client devices. For example, a user may view a video in a media player. The companies often seek to improve their service by analyzing events that occur while the users are using their client devices. For example, while viewing the video, the user performs different actions, such as seeking to different times in the video, stopping the video, hovering over icons, etc. Web requests are generated to document the actions taken at the client devices (also referred to as "beacons"). For example, when a user's browser requests information from a website, a server may aggregate information, such as the IP address of the computer being used; the time the material was viewed; the type of browser that was used, the type of action taken by the user, etc. The beacons are logged and aggregated for the company.

The beacons include information that is in an unstructured format. The unstructured format is not in a pre-defined data model that a company can easily store in a structured database. For example, many analysis applications are keyed to retrieve data in fields in a structured database. The beacons do not include data that can easily be stored in the correct fields. Thus, if a company is going to analyze the information in the beacons, the company needs to transform the unstructured data into structured data. The structured data organizes the data in a format desired by the company where the company can then analyze the structured data.

The company may want to aggregate the structured data that is received into certain reports or into other tables of a database. For example, an aggregation may be performed hourly, daily, or weekly. For example, a user may want to know how many views of a video occur every hour. This would require a separate query for every hour block. Since a query needs to be run every hour, a user must manually write different queries for every hour. This becomes a tedious process to have to write so many queries.

SUMMARY

In one embodiment, a method receives a specification for aggregating data from processing of beacons. A beacon is associated with an event occurring at a client while a user is interacting with a web application and including unstructured data. The method then parses the specification to automatically generate an aggregation to aggregate structured data that has been converted from the unstructured data and stores dependency information for changes to the aggregation. State information is analyzed and the dependency information to determine when a change in the state information indicates that a change should be made to the aggregation. The method then dynamically changes the aggregation based on the analyzing to generate a new aggregation to aggregate different data based on changed information.

In one embodiment, a non-transitory computer-readable storage medium is provided containing instructions, that when executed, control a computer system to be configured for: receiving a specification for aggregating data from processing of beacons, a beacon being associated with an event occurring at a client while a user is interacting with a web application and including unstructured data; parsing the specification to automatically generate an aggregation to aggregate structured data that has been converted from the unstructured data; storing dependency information for changes to the aggregation; analyzing state information and the dependency information to determine when a change in the state information indicates that a change should be made to the aggregation; and dynamically changing the aggregation based on the analyzing to generate a new aggregation to aggregate different data based on changed information.

In one embodiment, a system is provided comprising: one or more computer processors; and a non-transitory computer-readable storage medium comprising instructions, that when executed, control the one or more computer processors to be configured for: receiving a specification for aggregating data from processing of beacons, a beacon being associated with an event occurring at a client while a user is interacting with a web application and including unstructured data; parsing the specification to automatically generate an aggregation to aggregate structured data that has been converted from the unstructured data; storing dependency information for changes to the aggregation; analyzing state information and the dependency information to determine when a change in the state information indicates that a change should be made to the aggregation; and dynamically changing the aggregation based on the analyzing to generate a new aggregation to aggregate different data based on changed information.

The following detailed description and accompanying drawings provide a better understanding of the nature and advantages of particular embodiments.

BRIEF DESCRIPTION OF THE DRAWINGS

FIG. 2A shows a table that is storing transactions according to one embodiment.

FIG. 2B shows an example of a table that includes aggregated data from table according to one embodiment.

DETAILED DESCRIPTION

Described herein are techniques for an aggregation system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Figure 1:
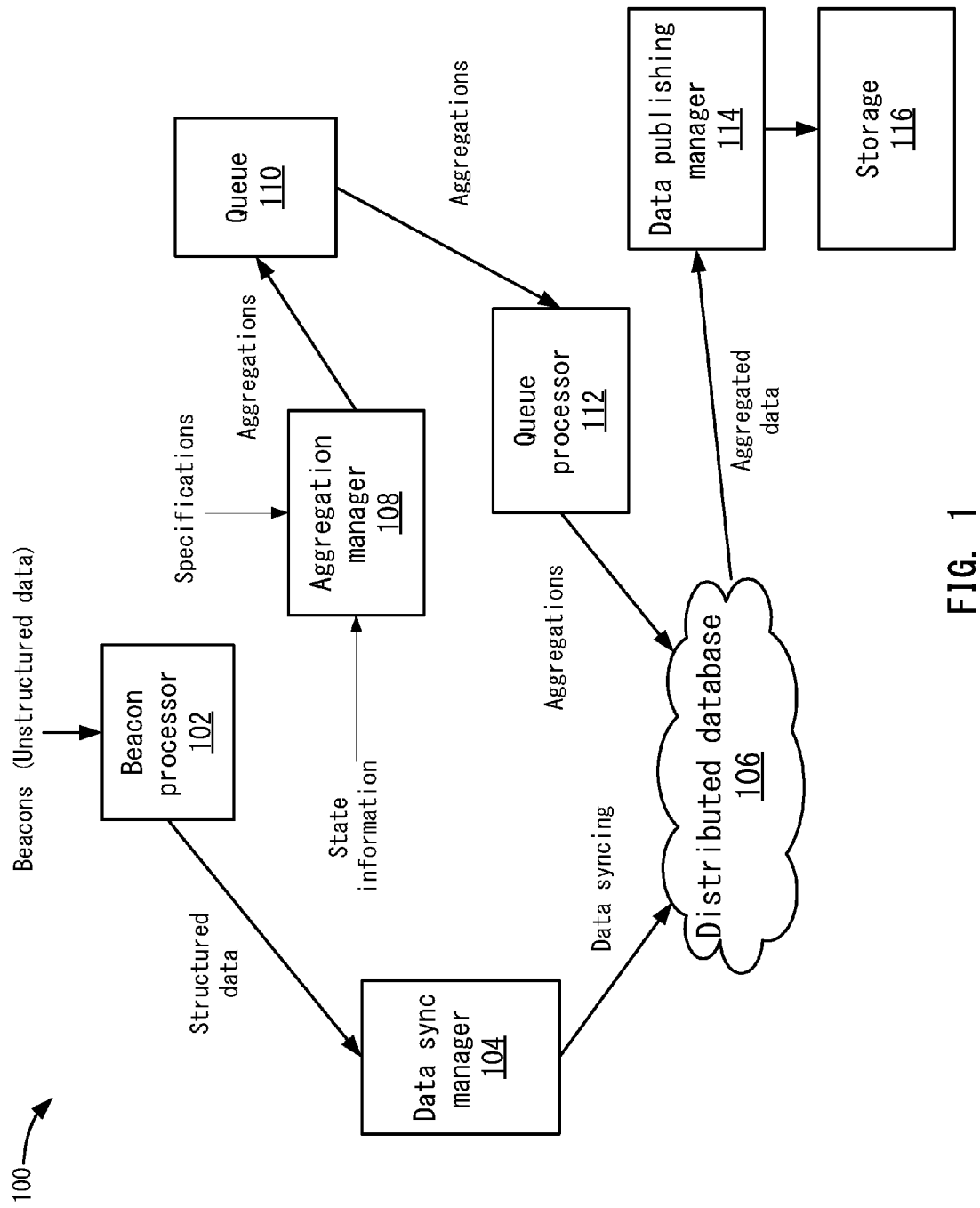
FIG. 1 depicts a simplified system for aggregating data according to one embodiment.

FIG. 1 depicts a simplified system 100 for aggregating data according to one embodiment. System 100 includes a beacon processor 102 that receives beacons, which may include unstructured data, and transforms the unstructured data into structured data. The beacons may include unicode strings and URL encoded binary strings. To obtain any further semantic meaning of the beacon data, the beacon data needs to be interpreted and transformed by target programs. Although beacons are described, which may be web event logs for events that occur while users use clients 102, other types of unstructured data may be appreciated. For example, beacons may also include extensible mark-up language (XML) specifications, hypertext transfer mark-up language (HTML) code, and other human-readable documentation.

Users interact with clients to produce events. For example, users may interact with websites on the worldwide web (WWW), such as through mouse clicks, hovering over objects, and other user interactions with web pages. Beacons are created based on the events and include information for the actions taken by the users and may also include other metadata about the event. For example, the metadata may include user identification information, what platform (e.g., device type or operating system) is being used, what application is being used, etc. Also, different clients and different web sites may generate beacons in different formats.

In one embodiment, beacon processor 102 runs target programs, which may be MapReduce jobs, or other non-distributed processes to convert the unstructured data to structured data. The jobs may be run at various intervals, such as every minute, hourly, daily, or weekly. MapReduce jobs may be distributed methods that are designed for doing individual and independent units of work in a highly distributed fashion, unifying data on a single machine only in the most limited scope necessary to complete processing. This allows data processing to scale near linearly with the amount of machines added to a computing cluster rather than being artificially bound by the size and power of an individual processing server.

A data sync manager 104 receives the processed structured data and syncs the data into a distributed database 106. The syncing that is performed may add transactions to tables in distributed database 106. For example, a transaction may be added for each event that is received. The additional transactions are added at the end of a table. Data sync manager 104 syncs the received data with other transactions in the table. The sync may retrieve and include metadata from various other services and datastores for the transaction. For instance, structured transactional data may contain a userid that correlates to a user metadata table with extra information about the user (which may not be written into each transaction for space and efficiency considerations). Data sync manager 104 also marks the data as available when the sync is successful.

Distributed database 106 may store data that is distributed on multiple storage devices. That is, tables may be partitioned and portions of the tables are stored on different storage devices in distributed database 106. In one example, FIG. 2A shows a table 200 that is storing transactions according to one embodiment. Table 200 may be a large table that stores various information for transactions that are stored for the received events. For example, a column 202-1 stores a number of video views, a column 202-2 stores a user identifier (ID), a column 202-3 stores a title of the video, a column 202-4 stores a content partner, a column 202-5 stores a device, and other columns may be appreciated.

Data sync manager 104 may sync the data in table 200 after beacon processor 102 processes beacons that are received. For example, additional transactions are added as different users view various videos. For example, at 204, a row 1 shows a video of "Title #1" was viewed by a user "User #1" of a content partner "Partner #1" on a "Mobile" device. Additional transactions are added and describe other events. For example, different users may view a video, and the transactions describe these events. In one example, at 206, a row 2 shows the video of "Title #1" was viewed by a user "User #2" of a content partner "Partner #1" on a "mobile device". Other transactions include different combinations of users, titles, partners, and devices.

A company (or any other entity) may want to analyze data stored in table 200. However, the company may want to analyze only portions of the data in table 200 for certain aggregations. Thus, table 200 may include a large amount of data that may not be relevant to what the company wants to analyze. For example, the company may want to analyze the number of video views for a certain title in an hourly basis. However, in this case, the company does not need to know who viewed the video. Thus, the user identifier of a user who viewed the video is not needed, but is stored in table 200. Due to the large size of table 200, aggregating from table 200 may not be as fast as if only transactions for views of a video were stored without any extraneous information. Also, table 200 stores transactions for individual events. For example, if 300 views of a title were made in an hour, table 200 includes 300 transactions for individual views. If the company were to analyze the transactions in table 200, the 300 transactions would have to be extracted and counted. This may result in longer response times to generate a result to the aggregation of the number of views for an hour.

To provide more efficient aggregation processing, particular embodiments may aggregate data from table 200 into other, more specialized (e.g., smaller) tables. For example, a table that aggregates the number of views for a title may be generated from table 200. FIG. 2B shows an example of a table 210 that includes aggregated data from table 200 according to one embodiment. In this case, a column 212-1 is for an hour range in a day, a column 212-2 shows the title, and a column 212-3 shows the number of views in the hour. The hour column identifies the hour in the day in which the number of views is counted. The title column indicates various different titles in which views have been counted. The count column indicates the number of views for a title in each hour on each specific day.

Running aggregations for the number of views on table 210 is much faster than running aggregations on table 200 because the data in table 210 has been aggregated previously. For example, a user might want to determine the number of views of a title from 7:00 pm to 8:00 pm on Jan. 1, 2012. Instead of aggregating for every transaction for title #1 in table 200 between the hours of 7:00 pm to 8:00 pm on Jan. 1, 2012 for the title, and then aggregating the number of transactions to determine the views in the hour, a use may aggregation table 210 for the number of views in the hour. In this case, a single entry in table 210 includes the number of views in the desired hour and can be retrieved. However, if table 200 is used, each transaction would have to be parsed to determine which transactions are for title #1. Then, the number of entries is summed to determine the number of views. However, using table 210, if only the views in a single hour are needed, then one aggregation to a row at 212 may be performed to determine the number of views in the hour is used to determine the number of views for Title #1. Also, if the number of views in a day are required, then the number of views in that day may also been aggregated in another table (not shown). If the day aggregation had not be previously performed, the number of views for every hour of the day may be aggregated for Title #1 in table 210, which may require aggregating 24 entries in table 210 (e.g., aggregating entries 212, 214, and so on). By aggregating transactions previously, particular embodiments may process aggregations much faster.

The aggregations that need to be performed to aggregate data from table 200 to various tables 210 may need to change based on different conditions. For example, if a user desires to aggregate the number of views for a title every day, aggregation manager 108 receives a specification and determines when a time period for a day has passed and adjusts or creates a new aggregation such that the aggregation can aggregate data from a next day for the title. Particular embodiments block all aggregation until all underlying data (either directly synced data or an underlying aggregation) is completely ready. Given the asynchronous nature of distributed systems, this type of gatekeeping on data availability always gives the same output given the same input. Without this blocking, results may be non-deterministic because they would rely on the state of the system at the time of aggregation. With this state management, particular embodiments can guarantee repeatable results since all lower level data is finalized before higher level aggregates are created. For example, a first aggregation may be "Aggregate views for 'Title #1' for Jan. 1, 2012". This aggregation may be run to aggregate views on Jan. 1, 2012. However, this aggregation cannot be used to aggregate views on Jan. 2, 2012. An aggregation manager 108 may manage aggregations that need to be performed on distributed database 106. For example, aggregation manager 108 may adjust queries based on state information. Thus, when state information indicates a new aggregation is needed, aggregation manager 108 adjusts the aggregation or creates a new aggregation, such as the first aggregation is adjusted to be "Aggregate views for "Title #1" for Jan. 2, 2012".

Referring back to FIG. 1, aggregation manager 108 stores aggregations in a queue 110, which may be used to prioritize when aggregations are run on distributed database 106. For example, queue 110 may store aggregations for multiple aggregations, and a queue processor 112 reads queue 110 and determines which aggregations should be performed on distributed database 106. Queue processor 112 may select aggregations from queue 110 using a policy and apply them to distributed database 106. For example, queue processor 112 may select aggregations from queue 110 based on a priority assigned to the aggregations. Also, queue processor 112 may use an algorithm, such as first in first out (FIFO), to select the aggregations. Upon a successful aggregation, queue processor 112 may mark the data as available for publishing or available for aggregation.

A data publishing manager 114 may publish the aggregated data to various other storage 116. For example, storage 116 may be files, other databases, or reports. Data publishing manager 114 may publish the data once the aggregations have run successfully. For example, if an aggregation is aggregating the number of views for a day, data publishing manager 114 may publish the data for the number of views for a title daily. In publishing the data, data publishing manager 114 may store the data in a table 210 as shown in FIG. 2B. This provides a table with the aggregated data that may be more easily aggregated to generate reports.

Figure 3:
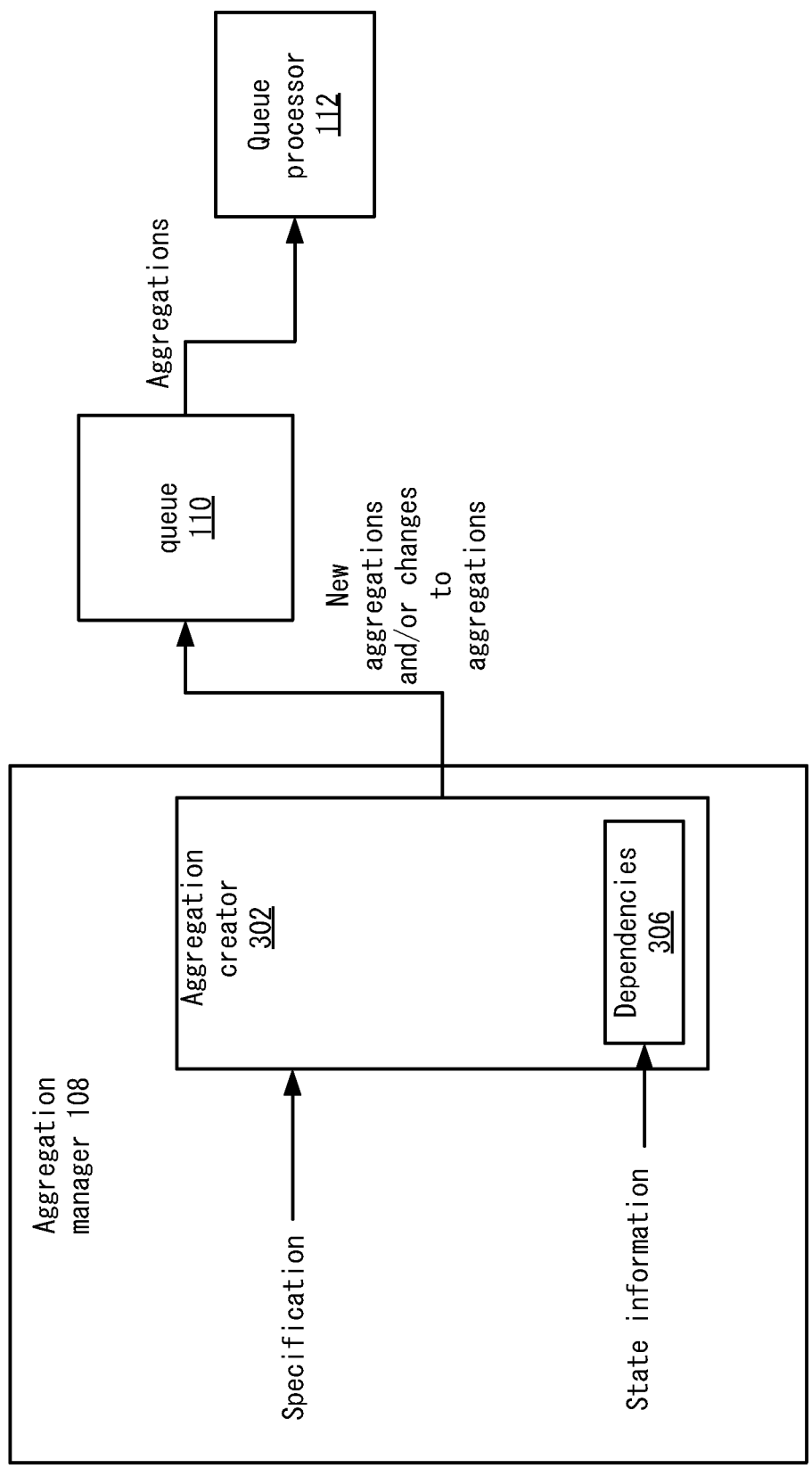
FIG. 3 depicts a more detailed example of the aggregation scheduler according to one embodiment.

FIG. 3 depicts a more detailed example of aggregation manager 108 according to one embodiment. An aggregation creator 302 receives a specification for generating aggregations, which may be queries, jobs, or other processes. The specification may be generated by a user that wants to have a specific aggregation performed on data stored in distributed database 106. The specification may indicate multiple aggregations that should be performed over multiple periods. For example, the specification may define the aggregation and also instructions on how to adjust the aggregation based on state information. An example of an aggregation may indicate that the number of views for certain titles should be aggregated hourly. Although conventionally, a user would have had to write a separate aggregation for every hour, in this case, the user would only provide one specification to have the multiple aggregations performed.

In this case, the specification may specify that the number of views for a Title #1 is aggregated hourly. For a first hour, aggregation creator 302 generates an aggregation and stores the aggregation in queue 110. For example, the first aggregation may be "Aggregate views for 'Title #1' for Jan. 1, 2012 between 7:00 pm and 8:00 pm". As discussed above, this aggregation cannot be used to aggregate views for another hour. To address this problem, aggregation creator 302 stores dependencies in storage 306 from the specification that are used to determine when to adjust the aggregation or create a new aggregation. A dependency may be information that defines which state information should be monitored to determine when to change an aggregation. For example, the dependency may include a condition and an action. The condition defines information that needs to be met by the state information, such as the condition may be when an hour elapses. The action indicates what aggregation creator 302 should do when the condition is met, such as aggregation creator 302 should generate a new aggregation or change the existing aggregation for the next hour.

In one example, if total views for an hour should be aggregated, then the dependency may be to determine when the hour has elapsed. When state information, such as a time and date, is received at aggregation creator 302, aggregation creator 302 analyzes the state information and determines when the hour has elapsed. For example, when the time is 8:00 pm on Jan. 1, 2012, aggregation creator 302 determines a condition for the dependency has been met and the prior aggregation from the previous hour is not valid. That is, the prior aggregation had been aggregating the number of views for the previous hour. Aggregation manager 108 then determines that a new aggregation needs to be submitted (or the prior aggregation needs to be modified).

Aggregation creator 302 can generate the new aggregation and store the new aggregation in queue 110. If the prior aggregation was to aggregate the number of views between 7:00 pm and 8:00 pm on Jan. 1, 2012 and the time changes to 8:00 pm on Jan. 1, 2012, aggregation creator 302 stores a new aggregation in queue 110 that aggregates the aggregations for the hour between 8:00 pm and 9:00 pm on Jan. 1, 2012. As discussed above, the new aggregation may be "Aggregate views for "Title #1" between 8:00 pm and 9:00 pm on Jan. 1, 2012". As shown, the new time is hardcoded into the new aggregation. Aggregation creator 302 adds the new aggregation to queue 110, and queue processor 112 continues to process aggregations from queue 110 as described above.

The following describes the data that is aggregated based on the aggregations. At each hour, a new aggregation is generated. For example, the aggregation on day #1 for hour #1 may be aggregate views for Title #1 hourly. This aggregation would aggregate data for views that were stored in distributed database 106 for hour #1 on day #1. The aggregated data would be "Hour #1-Day #1-Title #1-2000 views". However, once transactions for views during hour #2 on day #2 are stored in distributed database 106, the above aggregation would not aggregate any of these new views. Thus, aggregation manager 304 generates a new aggregation of aggregate the number of views for title #1 on day #2 for hour #2. This aggregates the number of views for hour #2 on day #1 for title #1. The aggregated data would be "Hour #2-Day #1-Title #1-3050 views". This continues for an n number of hours where for each hour, aggregation creator 302 generates a new aggregation. Data publishing manager 114 may store each aggregated data in a table 210 as described above. Thus, when the company wants to know how many views for Title #1 occurred for a certain hour, the company accesses table 210. For example, an aggregation for hour #1 yields 2000 views.

Figure 4:
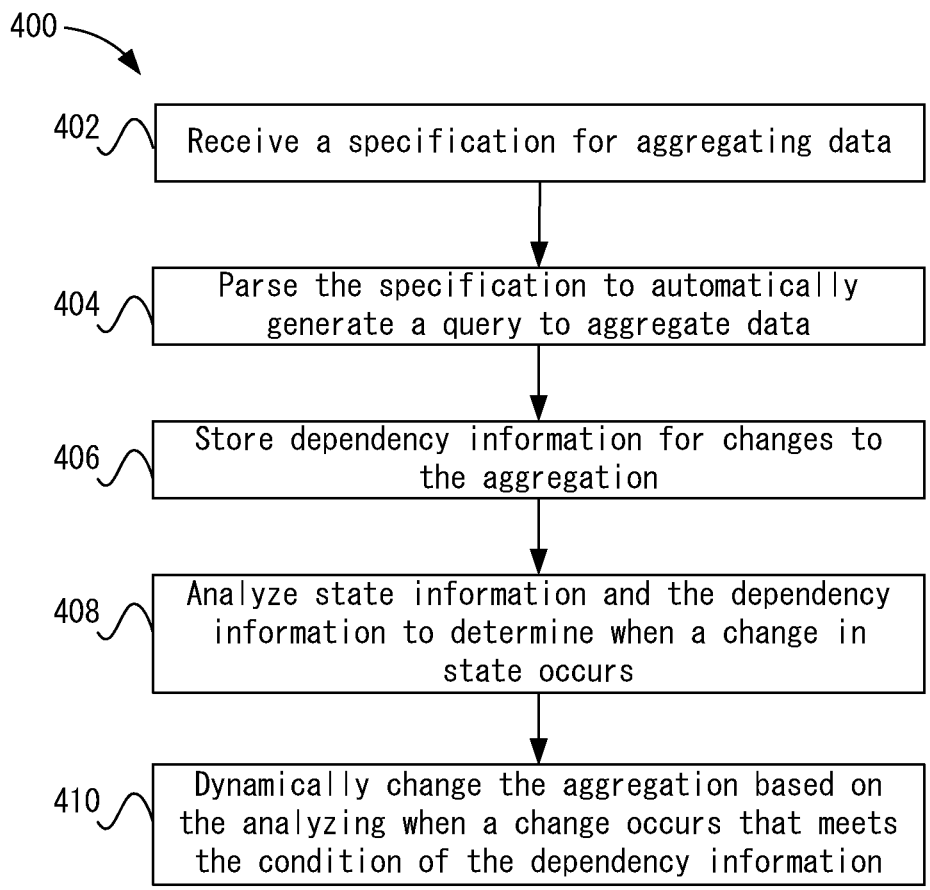
FIG. 4 depicts a simplified flowchart of a method for aggregating data according to one embodiment.

FIG. 4 depicts a simplified flowchart 400 of a method for aggregating data according to one embodiment. At 402, aggregation manager 108 receives a specification for aggregating data. At 404, aggregation manager 108 parses the specification to automatically generate an aggregation to aggregate data. At 406, aggregation manager 108 stores dependency information for changes to the aggregation. For example, the dependency information may indicate a condition and action.

At 408, aggregation manager 108 analyzes state information and the dependency information to determine when a change in state occurs. At 410, when a change occurs that meets the condition of the dependency information, at 412, aggregation manager 108 dynamically changes the aggregation based on the analyzing. This generates an aggregation that can aggregate the data according to a new condition. For example, the aggregation may be changed to aggregate data from a different hour.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
   receiving a specification for aggregating data from processing of beacons, a beacon being associated with an event occurring at a client while a user is interacting with a web application and including unstructured data;
   parsing, by a computer system, the specification to automatically generate an aggregation to aggregate structured data that has been converted from the unstructured data, the aggregation aggregating a first subset of data stored in a first table based on a first condition;
   storing, by the computer system, dependency information for changes to the aggregation, the dependency information determined from the specification;
   determining, by the computer system, state information based on the dependency information;
   analyzing, by the computer system, the state information and the dependency information to determine when a change in the state information indicates that a change should be made to the aggregation; and
   dynamically changing, by the computer system, the aggregation based on the analyzing to generate a new aggregation to aggregate different data, the new aggregation aggregating a second subset of data stored in the first table based on a second condition that was changed from the first condition.

2. The method of claim 1, further comprising:
   receiving the state information;
   comparing the state information to the dependency information; and
   when the state information satisfies a condition of the dependency information, dynamically changing the aggregation to generate the new aggregation or and executing the new aggregation.

3. The method of claim 2, wherein the dependency information is associated with an action, wherein dynamically changing the aggregation to generate the new aggregation is based on the action.

4. The method of claim 1, wherein the aggregation is changed to the new aggregation to aggregate data from a different time range or date range.

5. The method of claim 1, further comprising:
   applying the aggregation to a database to aggregate the data from the first table according to the aggregation; and
   applying the new aggregation to the database to aggregate the data from the first table according to the new aggregation.

6. The method of claim 5, further comprising storing the data from the aggregation and the new aggregation in a second table separate from the first table.

7. The method of claim 6, further comprising:
   receiving the structured data from a beacon processor; and
   syncing the structured data into a series of transactions for the events in the first table, wherein the aggregated data in the second table aggregates a portion of the transactions.

8. The method of claim 1, further comprising:
   storing the new aggregation in a queue; and
   analyzing aggregations stored in the queue to apply the aggregations based on a priority.

9. A non-transitory computer-readable storage medium containing instructions, that when executed, control a computer system to be configured for:
   receiving a specification for aggregating data from processing of beacons, a beacon being associated with an event occurring at a client while a user is interacting with a web application and including unstructured data;
   parsing the specification to automatically generate an aggregation to aggregate structured data that has been converted from the unstructured data, the aggregation aggregating a first subset of data stored in a first table based on a first condition;
   storing dependency information for changes to the aggregation, the dependency information determined from the specification;
   determining state information based on the dependency information;
   analyzing the state information and the dependency information to determine when a change in the state information indicates that a change should be made to the aggregation; and
   dynamically changing the aggregation based on the analyzing to generate a new aggregation to aggregate different data, the new aggregation aggregating a second subset of data stored in the first table based on a second condition that was changed from the first condition.

10. The non-transitory computer-readable storage medium of claim 9, further configured for:
    receiving the state information;
    comparing the state information to the dependency information; and
    when the state information satisfies a condition of the dependency information, dynamically changing the aggregation to generate the new aggregation and executing the new aggregation.

11. The non-transitory computer-readable storage medium of claim 10, wherein the dependency information is associated with an action, wherein dynamically changing the aggregation to generate the new aggregation is based on the action.

12. The non-transitory computer-readable storage medium of claim 9, wherein the aggregation is changed to the new aggregation to aggregate data from a different time range or date range.

13. The non-transitory computer-readable storage medium of claim 9, further configured for:
applying the aggregation to a database to aggregate the data from the first table according to the aggregation; and
applying the new aggregation to the database to aggregate the data from the first table according to the new aggregation.

14. The non-transitory computer-readable storage medium of claim 13, further comprising storing the data from the aggregation and the new aggregation in a second table separate from the first table.

15. The non-transitory computer-readable storage medium of claim 14, further configured for:
receiving the structured data from a beacon processor; and
syncing the structured data into a series of transactions for the events in the first table, wherein the aggregated data in the second table aggregates a portion of the transactions.

16. The non-transitory computer-readable storage medium of claim 9, further configured for:
storing the new aggregation in a queue; and
analyzing aggregations stored in the queue to apply the aggregations based on a priority.

17. A system comprising:
one or more computer processors; and
a non-transitory computer-readable storage medium comprising instructions, that when executed, control the one or more computer processors to be configured for:
receiving a specification for aggregating data from processing of beacons, a beacon being associated with an event occurring at a client while a user is interacting with a web application and including unstructured data;
parsing the specification to automatically generate an aggregation to aggregate structured data that has been converted from the unstructured data, the aggregation aggregating a first subset of data stored in a first table based on a first condition;
storing dependency information for changes to the aggregation, the dependency information determined from the specification;
determining state information based on the dependency information;
analyzing the state information and the dependency information to determine when a change in the state information indicates that a change should be made to the aggregation; and
dynamically changing the aggregation based on the analyzing to generate a new aggregation to aggregate different data, the new aggregation aggregating a second subset of data stored in the first table based on a second condition that was changed from the first condition.

18. The system of claim 17, further configured for:
receiving the state information;
comparing the state information to the dependency information; and
when the state information satisfies a condition of the dependency information, dynamically changing the aggregation to generate the new aggregation and executing the new aggregation.

19. The system of claim 17, further configured for:
applying the aggregation to a database to aggregate the data from the first table according to the aggregation; and
applying the new aggregation to the database to aggregate the data from the first table according to the new aggregation.

20. The system of claim 17, wherein the dependency information is associated with an action, wherein dynamically changing the aggregation to generate the new aggregation is based on the action.

* * * * *